United States Patent
Tu et al.

(10) Patent No.: US 7,811,698 B2
(45) Date of Patent: Oct. 12, 2010

(54) BATTERY COVER ASSEMBLY FOR PORTABLE ELECTRONIC DEVICE

(75) Inventors: Ying-Liang Tu, Shenzhen (CN); Chia-Hua Chen, Tu-Cheng (TW)

(73) Assignees: ShenZhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1005 days.

(21) Appl. No.: 11/309,809

(22) Filed: Oct. 2, 2006

(65) Prior Publication Data

US 2007/0166608 A1    Jul. 19, 2007

(30) Foreign Application Priority Data

Jan. 14, 2006   (CN) .................... 2006 1 0032954

(51) Int. Cl.
  *H01M 2/10* (2006.01)
  *H04M 1/00* (2006.01)
  *H05K 5/00* (2006.01)
  *H05K 5/03* (2006.01)

(52) U.S. Cl. .................... 429/98; 429/96; 429/100; 455/575.1; 455/575.8

(58) Field of Classification Search ........... 429/96–100; 455/575.1, 575.8
See application file for complete search history.

(56) References Cited

U.S. PATENT DOCUMENTS

| 4,431,717 | A  | * | 2/1984 | Kikuchi ................... 429/100 |
| 5,620,291 | A  | * | 4/1997 | Hayes et al. ............... 411/552 |
| 6,563,927 | B2 | * | 5/2003 | Mote et al. ............ 379/433.11 |
| 6,844,845 | B1 | * | 1/2005 | Whiteside et al. ........ 342/357.1 |
| 7,002,073 | B2 |   | 2/2006 | Lai et al. |
| 7,303,424 | B2 | * | 12/2007 | Tu et al. ................... 439/372 |
| 2002/0002059 | A1 | * | 1/2002 | Johnson .................... 455/550 |

FOREIGN PATENT DOCUMENTS

JP       11135092 A  *  5/1999

* cited by examiner

*Primary Examiner*—Gregg Cantelmo
(74) *Attorney, Agent, or Firm*—Jeffrey T. Knapp

(57) ABSTRACT

A battery cover assembly includes a battery cover (20), a housing (10), and a locking member (30). The battery cover has a receiving hole (16) defined therein. The receiving hole is located proximate one end of the battery cover. The housing has a locking groove (184) defined in one end thereof. The locking member has an operating portion (32) and a latching tab (34). The operating portion is rotatably mounted in the receiving hole of the battery cover. The latching tab extends from one side of the operating portion. The latching tab is configured so as to be releasably lockable in the locking groove of the housing.

11 Claims, 8 Drawing Sheets

BATTERY COVER ASSEMBLY FOR PORTABLE ELECTRONIC DEVICE

FIELD OF THE INVENTION

The present invention generally relates to battery cover latching assemblies and, more particularly, to a battery cover latching assembly for use in a portable electronic device.

DESCRIPTION OF RELATED ART

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, e.g., the batteries are damaged or dead (i.e., no longer rechargeable).

A clasp structure or latch structure is used with a conventional battery cover to engage with a housing of a portable electronic device. For example, a related mobile phone has a latch for the battery cover. The latch includes a pair of hooks at one end of the battery cover and a locking pin protruding from the other end of the battery cover. Accordingly, a pair of grooves is defined in an end portion of a backside of a housing of the mobile phone, and a locking hole is defined in the other end portion of the backside of the housing. In assembly, the hooks are firstly inserted into the grooves in the backside of the housing. Then, the battery cover is pressed downwardly to the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm, too. However, during disassembly, a relative great effort is needed to disassemble the battery cover, since a substantial force needs to be exerted thereon. Therefore, the battery cover is susceptible to damage during such disassembly. As a result, it can be awkward for a user to replace a battery in the housing of the mobile phone.

Therefore, a new battery cover latching assembly is desired in order to overcome the above-described shortcomings.

SUMMARY OF THE INVENTION

In a first preferred embodiment, a battery cover assembly includes a battery cover, a housing, and a locking member. The battery cover has a receiving hole defined therein. The receiving hole is located proximate to one end of the battery cover. The housing has a locking groove defined in one end thereof. The locking member has an operating portion and a latching tab. The operating portion is rotatably mounted in the receiving hole of the battery cover. The latching tab extends from one side of the operating portion. The latching tab is configured (i.e., structured and arranged) so as to be releasably lockable in the locking groove of the housing.

Other advantages and novel features of the preferred embodiments of the present chip card retaining mechanism and its applications will become more apparent from the following detailed description when taken in conjunction with the accompanying drawings.

BRIEF DESCRIPTION OF THE DRAWINGS

Many aspects of the present battery cover latching assemblies and their applications can be better understood with reference to the following drawings. The components in the drawings are not necessarily drawn to scale, the emphasis instead being placed upon clearly illustrating the principles of the battery cover latching assemblies. Moreover, in the drawings, like reference numerals designate corresponding parts throughout the several views.

DETAILED DESCRIPTION OF THE INVENTION

The present invention is suitable for portable electronic devices, such as mobile phones, PDAs, and so on.

Figure 1A:
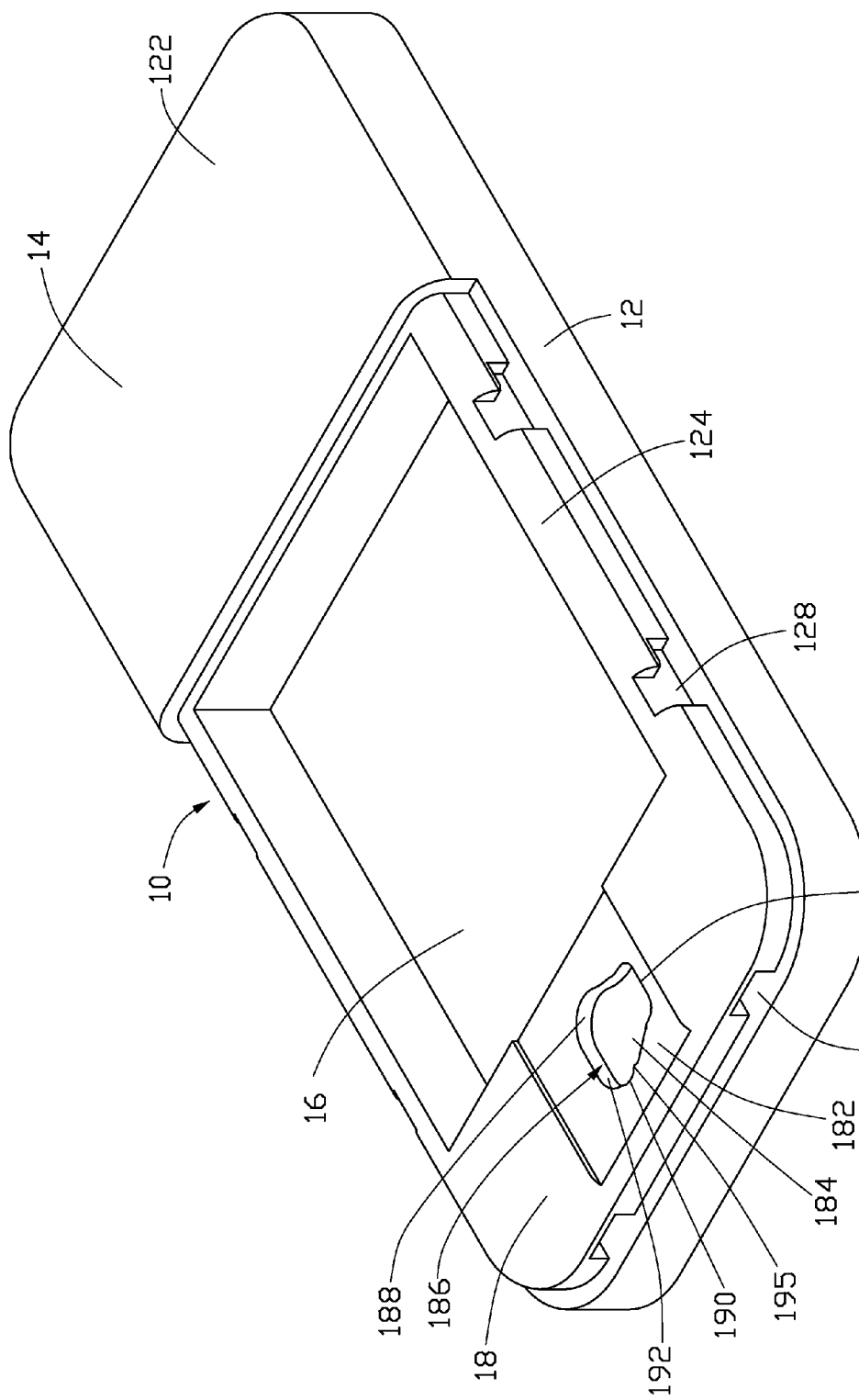
FIG. 1A is an isometric view of a housing of a battery cover assembly in accordance with a preferred embodiment.
Figure 2:
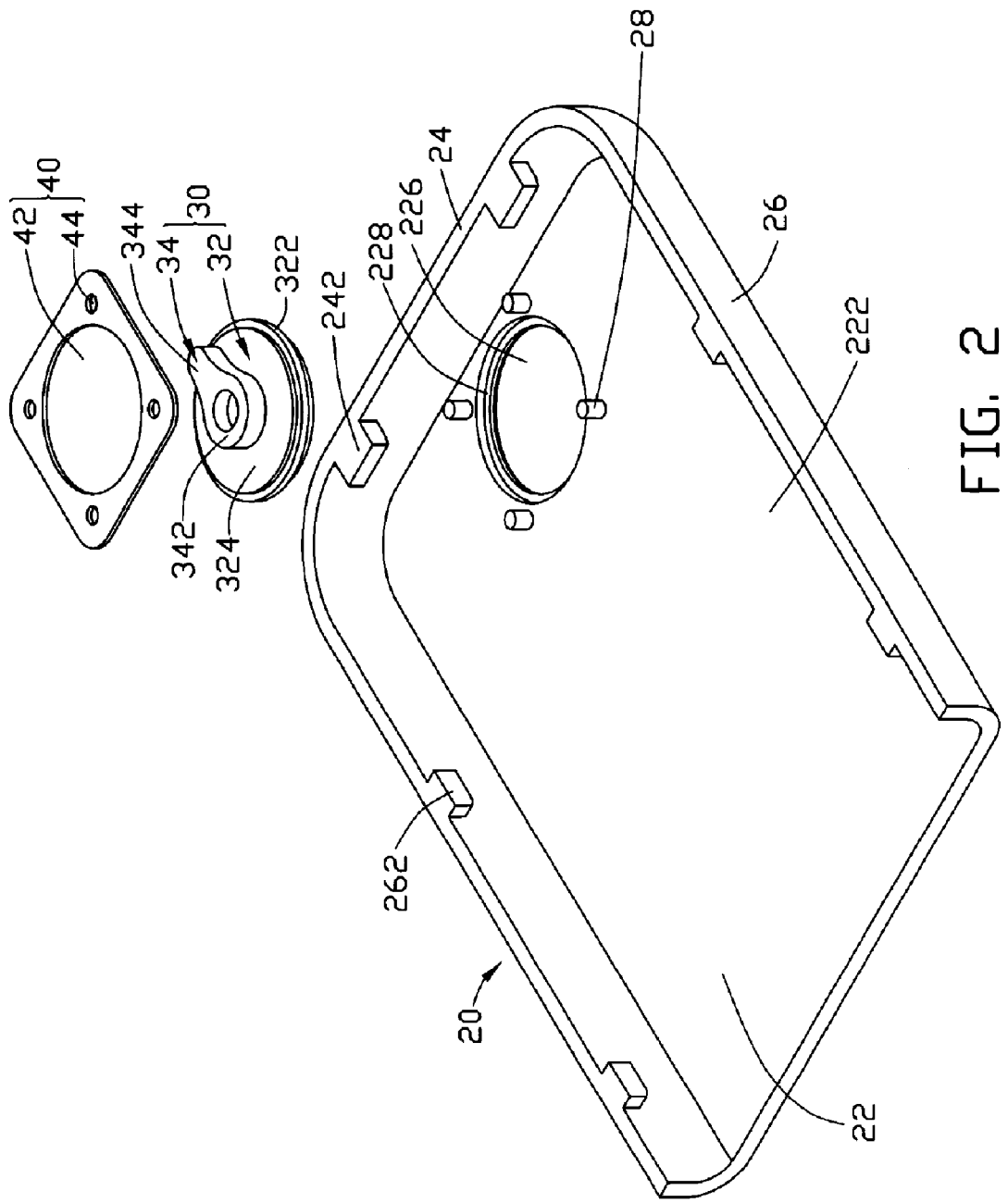
FIG. 2 is an exploded, isometric of the battery cover assembly.
Figure 7:
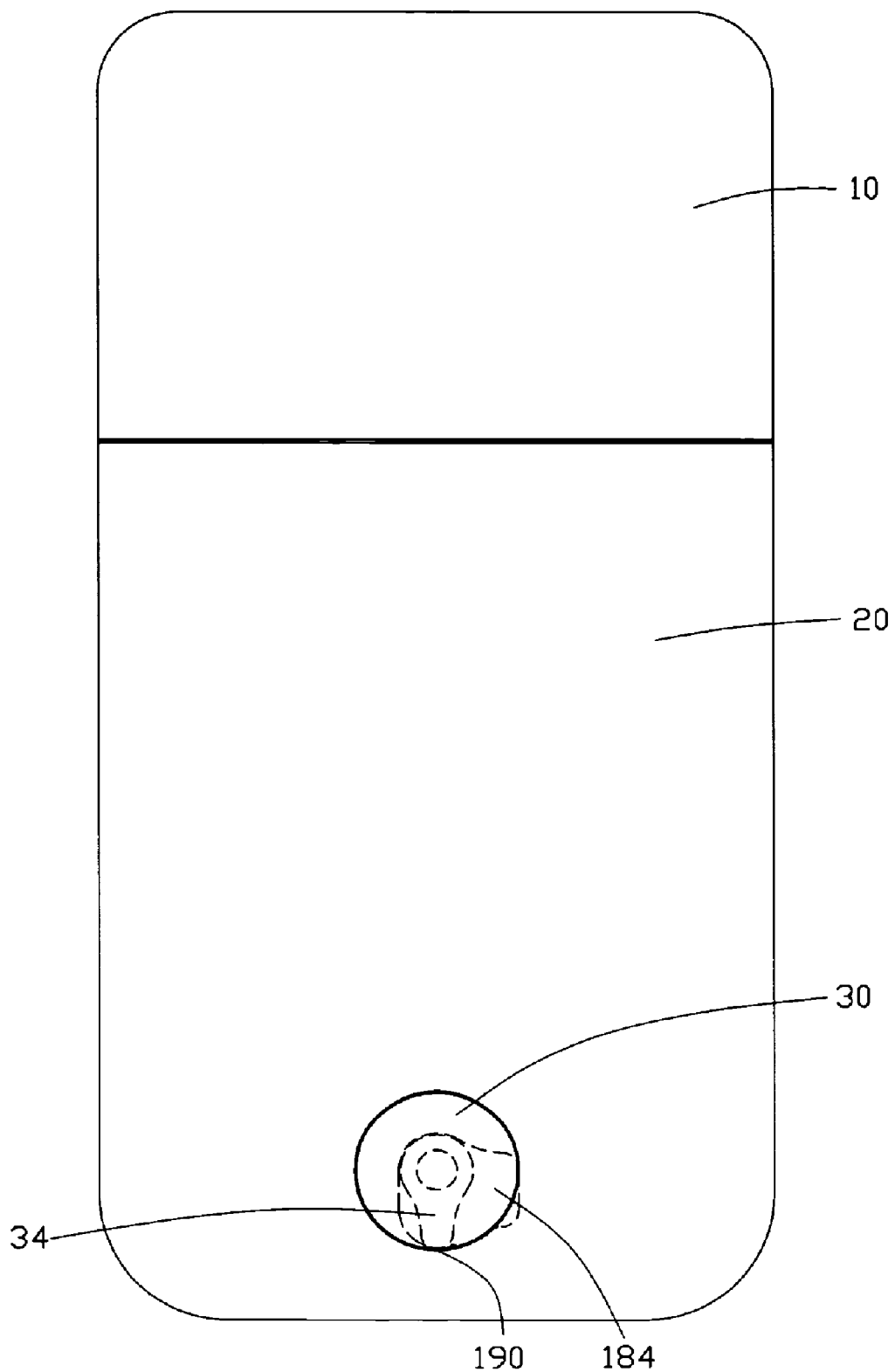
FIG. 7 is similar to FIG. 5, but shows a locking state of the battery cover.

Referring now to the drawings in detail, FIG. 1A and FIG. 2 show a battery cover assembly (best seen in FIG. 2) incorporated in a mobile phone/portable electronic device 200 (best seen in FIG. 7). The mobile phone 200 is taken here as an exemplary application, for the purposes of describing details of a battery cover assembly of the preferred embodiment. The mobile phone 200 includes a housing 10, and a battery cover 20. The battery cover assembly includes the battery cover 20, a locking groove 184 defined in the housing 10, a locking member 30, a washer 40, and an engaging mechanism (not labeled). The locking member 30 is rotatably attached to battery cover 20. Accordingly, the battery cover 20 is engaged with the housing 10 of the mobile phone 200 by means of the locking member 30.

Figure 1B:
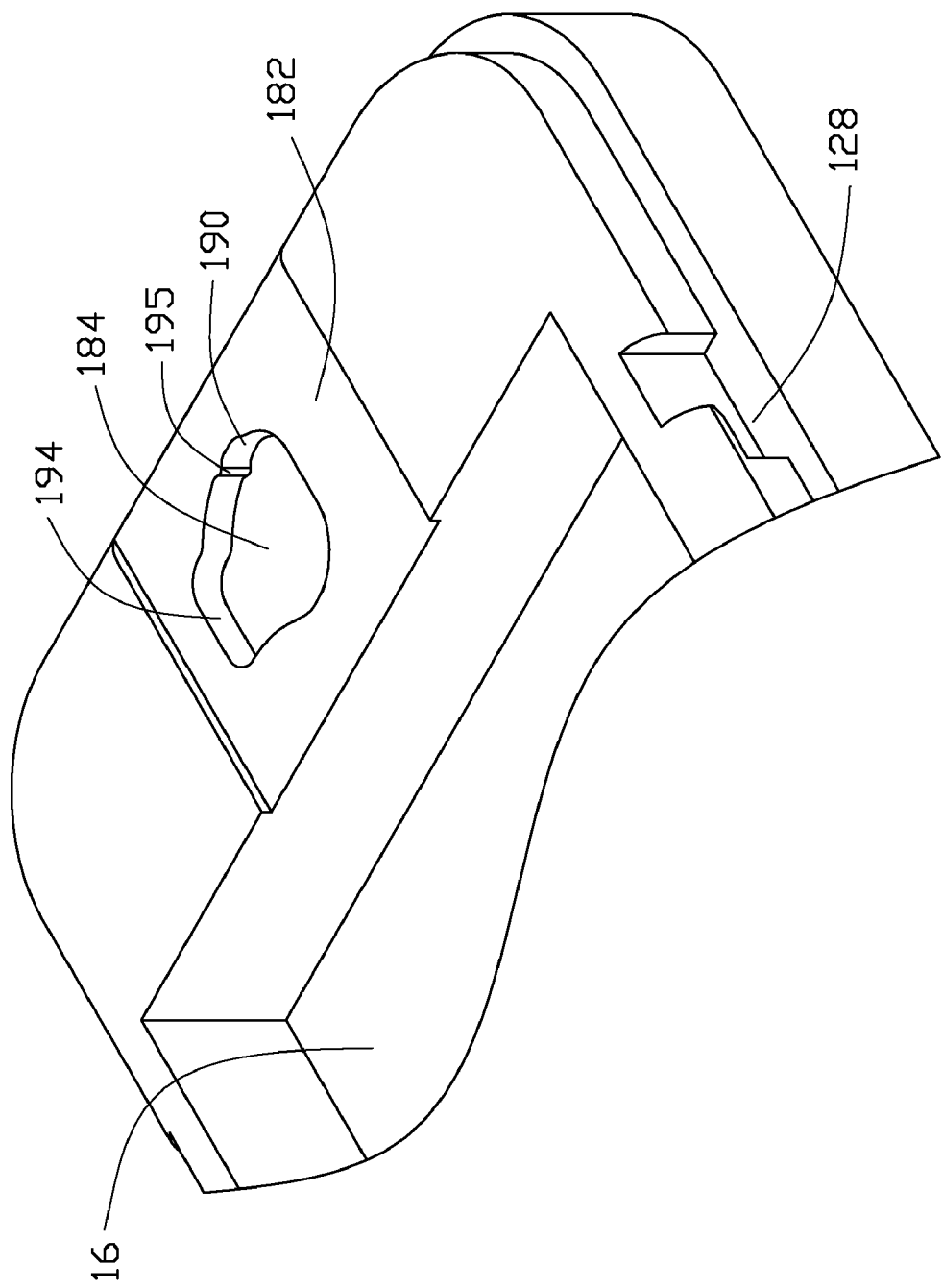
FIG. 1B is a partial view of the housing of FIG. 1A to show the raised dot from another aspect.

Referring to FIG. 1B, the housing 10 includes a main body 12. The main body 12 includes a rear surface portion 122, facing the battery cover 20. The main body 12 has a recessed portion 124 defined in the rear surface portion 122 thereof, thus dividing the rear surface portion 124 into a top portion 14 and the recessed portion 124. The recessed portion 124 is dimensioned to receive the battery cover 20. The main body 12 defines a substantially rectangular chamber 16 in the recessed portion 124 and adjacent to the top portion 14, thus forming a bottom portion 18 opposite to the top portion 14. The chamber 16 is used to receive a battery (not labeled). The bottom portion 18 defines a substantially rectangular concave portion 182. The bottom portion 18 defines a locking groove 184 in a bottom of the concave portion 182 and also defined by a contoured groove wall 186. The contoured groove wall 186 includes a first contoured sidewall 188, an opposite second contoured sidewall 190, and a first end wall 192, and an opposite second end wall 194. A width between the first contoured sidewall 188 and the second contoured sidewall 190 is gradually reduced from the first end wall 192 and the second end wall 194. The second contoured sidewall 190 is adjacent to one end of the housing 10. A raised dot 195 protrudes from the second contoured sidewall 190 and near the bottom first contoured end wall 192. The main body 12 defines two detents 126 in a distal end of the bottom portion 182 thereof. The main body also defines a plurality of catch slots 128 defined in two opposite sides of the recessed portion 14.

Figure 4:
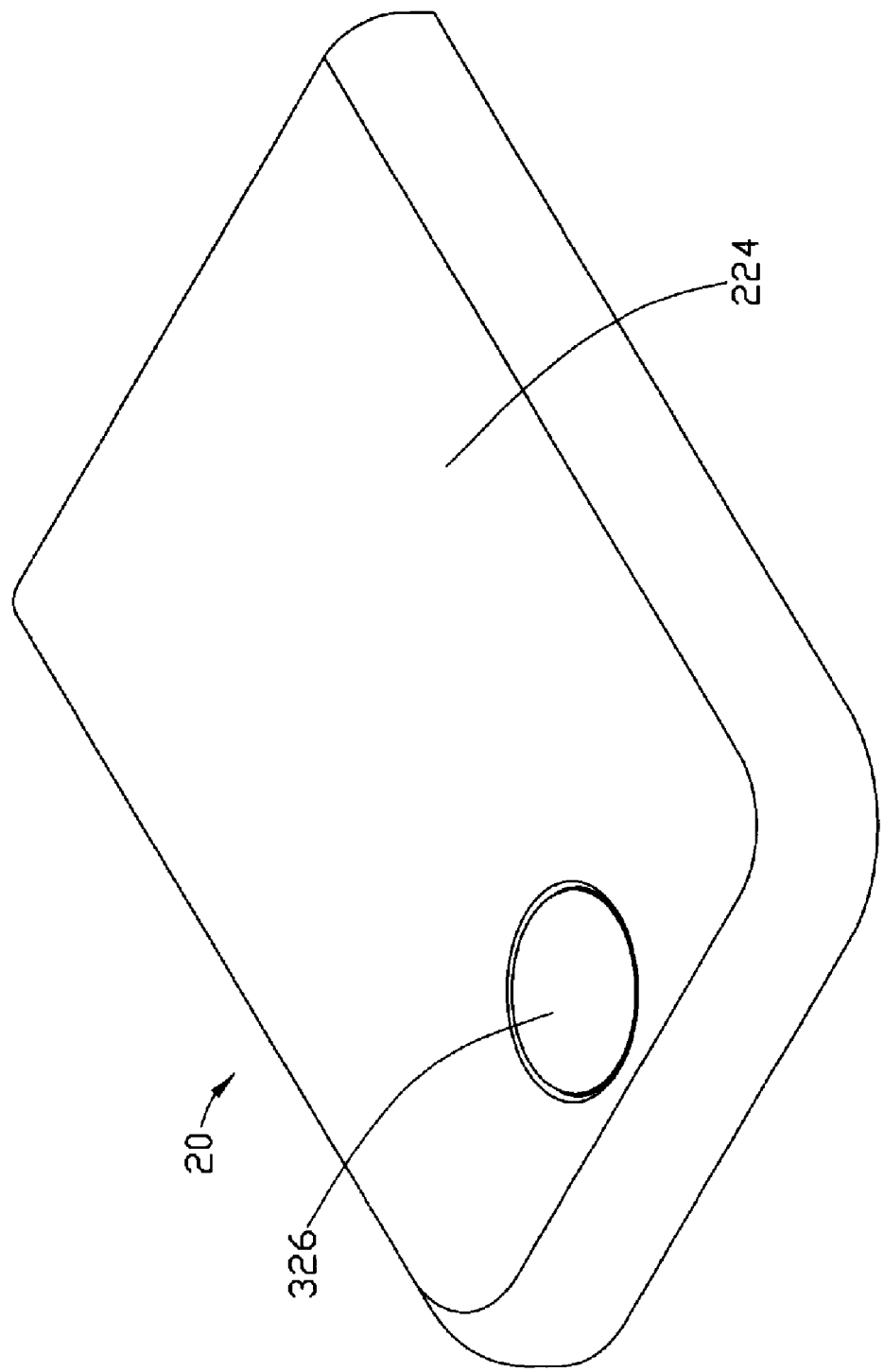
FIG. 4 is similar to FIG. 3, but shows another aspect.

The battery cover 20 includes a main body 22, a top wall 24, and two opposite sidewalls 26. The main body 22 includes an inner surface 222, which together with the top wall 24, the sidewalls 26 defines a substantially rectangular space (not labeled) for receiving a battery. The main body 22 includes an outer surface 224 (see FIG. 4) opposite to the inner surface 222. The main body 22 defines a circular receiving hole 226 extending therethrough and adjacent to the top wall 24. A circular groove 228 surrounding the receiving hole 226 is formed in the inner surface 222. A plurality of positioning pins 28 are formed on the inner surface 222 and surround the circular groove 228. Two latches 242 extend inwards from a distal end of the top wall 24, for engaging with the detents 126 of the housing 10. Similarly, a plurality of hooks 362 extend briefly from the sidewalls 36, for engaging with the catch slots 128 of the housing 10. The engaging mechanism includes the detents 126, the catch slots 128, the latches 242, and the hooks 262.

Figure 3:
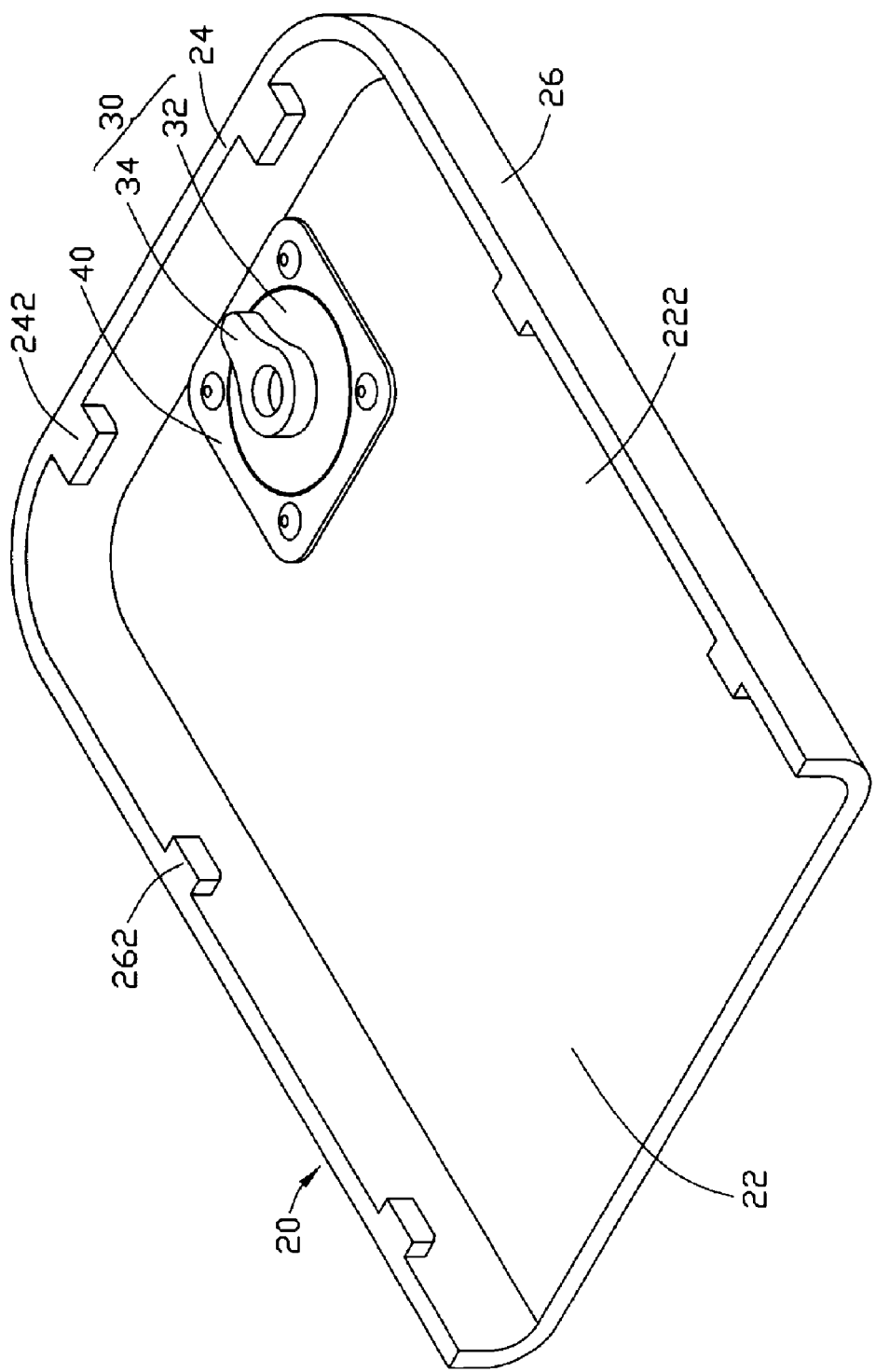
FIG. 3 is an assembled, isometric view of the battery cover assembly.

Referring to FIG. 3, the locking member 30 is rotatably mounted on the battery cover 20. The locking member 30 includes an operating portion 32, and a latching tab 34 protruding from one surface of the operating portion 32. The operating portion 32 is disk-shaped. The operating portion 32 has an annular circumferential protrusion 322, thus dividing the operating portion 32 into a top portion 324 and a bottom portion 326 (see FIG. 4). The latching tab 34 includes a circular protrusion 342 and a resisting portion 344 extending from a circumferential wall of the circular protrusion 342. A largest length of the latching tab 34 corresponds to a distance of the first end wall 192 and the second end wall 194 of the groove wall 186 of the housing 10.

The washer 40 is a substantially rectangular thin sheet and has a center hole 42 therein. Four symmetrical positioning holes 44 are defined in four corners of the washer 40, for receiving the positioning pins 28. The shape and size of a center hole 42 corresponds to that of the operating portion 32. The thickness of the washer 40 is equal to a depth of the concave portion 182.

In assembly, the operating portion 32 of the locking member 30 is received in the receiving hole 226 of the battery cover 20, with the annular circumferential protrusion 222 received in the circular groove 228, and the bottom portion 326 exposed from the outer surface 224 of the battery cover 20. The washer 40 is placed on the battery cover 20, with the positioning holes 44 receiving the respective positioning pins 28 of the battery cover 20. At this point, the washer 40 is then advantageously attached to the battery cover 20 by melting the positioning pins 28 of the battery cover 20.

Figure 5:
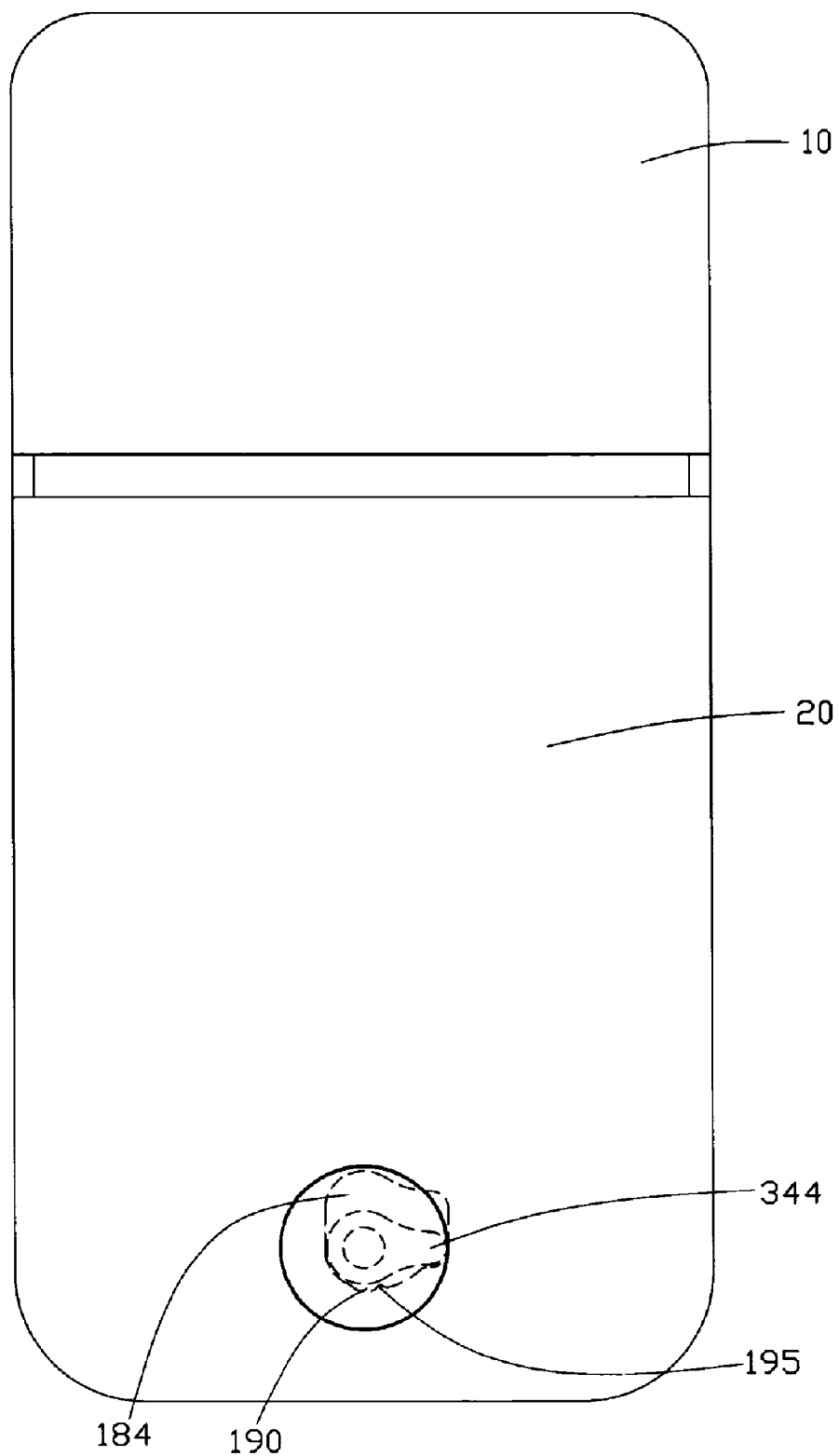
FIG. 5 is an assembled, isometric view of the battery cover assembly, showing an assembling process of the battery cover to the housing.
Figure 6:
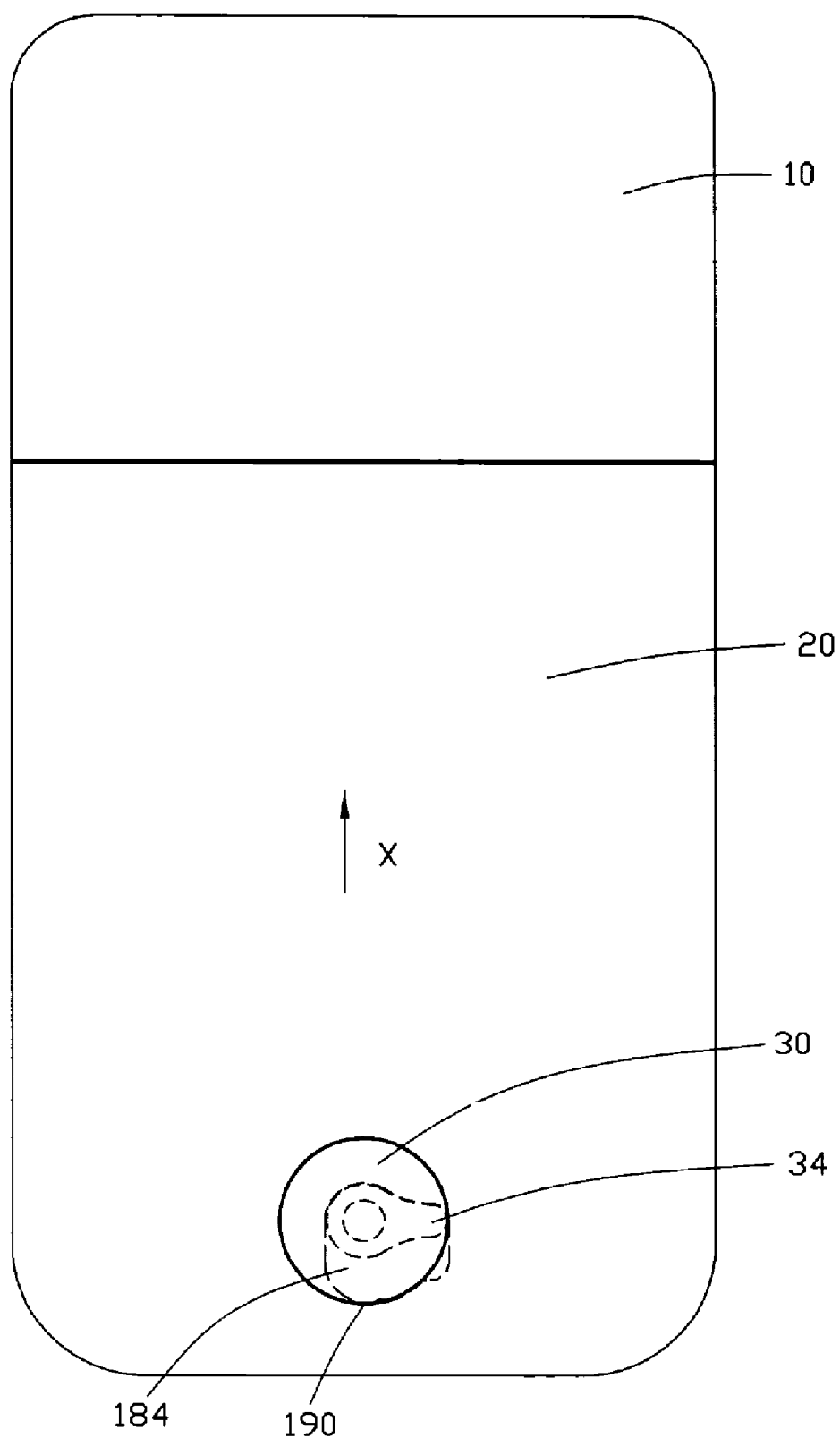
FIG. 6 is similar to FIG. 5, but shows an unlocking state of the battery cover.

Next, referring also to FIGS. 5-7, the combined battery cover 20 is attached to the housing 10 as follows. The battery cover 20 is placed on the recessed portion 124 of the housing 10, with the latches 242 aligned with the detents 126 of the housing 10 and the hooks 262 aligned with the catch slots 128 of the housing 10. The washer 40 is received in the concave portion 182 of the housing 10. Referring to FIG. 5, the latching tab 34 of the locking member 30 is received in the contoured groove 184, with the latching tab 34 abutting the second contoured sidewall 190 and the resisting portion 344 abutting the second end wall 194. The battery cover 20 is pushed toward the top portion 14 of the housing 10 in a direction as shown by X arrow until the battery cover 20 completely covers the recessed portion 124 of the housing 10, as shown in FIG. 6. The latching tab 34 of the battery cover 20 abuts the first contoured sidewall 188 of the groove wall 186.

The latches 242 and the hooks 262 of the battery cover 20 are completely engaged in the detents 126 and the catch slots 128 of the housing 10. Referring to FIG. 7, the locking member 30 is rotated about 90 degrees by operating the bottom portion 326 of the locking member 30. When the resisting portion 344 of the latching tab 34 rides over the raised dot 195 of the groove wall 186, the resisting portion 344 of the latching tab 34 abuts the second contoured sidewall 190 and the circular protrusion 342 abuts the first contoured sidewall 188. Thus, the battery cover 20 cannot be pushed forwards or backwards. Due to this rotation, the latching tab 34 of the locking member 30 is stably locked in the contoured groove 184 of the housing 10. The battery cover 20 is thus removably attached on the housing 20. During the above process, it can be readily realized that the locking member 30 can be located at an optimum position, thereby permitting the battery cover 20 to be stably attached on the housing 20.

When the battery cover 20 is detached from the housing 10, the locking member 30 is rotated about 90 degrees so that the resisting portion 344 of the latching tab 34 of the locking member 30 deflects away (i.e., disengages) from the first contoured sidewall 188 and abuts the second end wall 194. Then, the battery cover 20 is pushed away from the top portion 14 of the housing 10 until the latches 242 and the hooks 262 of the battery cover 20 disengage from the detents 126 and the catch slots 128 of the housing 10. Thus, the battery cover 20 is pulled away from the housing 10.

In alternative embodiments, the washer 40 may be pasted on or otherwise adhered to the battery cover 20 by, e.g., glue or an epoxy.

As described above, the preferred embodiment provides a battery cover assembly for devices such as a mobile phone 200. When the locking member is rotated, the battery cover 20 can be easily detached. This configuration provides the user with convenient operation of the device. Also, when the battery cover 20 is attached to the housing 10, the latching tab 34 of the locking member 30 is stably locked in the contoured groove 184 of the housing 10. Thus, the battery cover 20 can be stably attached on the housing 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly, comprising:
 a battery cover, the battery cover having a receiving hole defined therein, the receiving hole being located proximate to one end of the battery cover;
 a housing, the housing having a locking groove defined in one end thereof; the locking groove being contoured and defined by a contoured peripheral wall, a raised dot protruding from the contoured peripheral wall, the latching tab riding over the raised dot to abut against the contoured peripheral wall;
 a locking member, the locking member having an operating portion and a latching tab, the operating portion rotatably mounted in the receiving hole of the battery cover, the latching tab extending from one side of the operating portion, the latching tab being releasably lockable in the locking groove of the housing.

2. The battery cover assembly as claimed in claim 1, wherein the contoured peripheral wall includes a first contoured sidewall, an opposite second contoured sidewall, a first end wall and an opposite second end wall, a width between the first contoured sidewall and the second contoured sidewall gradually decreasing from the first end wall to the second end wall.

3. The battery cover assembly as claimed in claim 2, wherein the latching tab includes a circular protrusion and a resisting portion, the resisting portion extending, from the circular protrusion, a contour of the latching tab corresponds to one of the first and second contoured sidewalls.

4. The battery cover assembly as claimed in claim 1, further comprising a washer, the washer being configured for preventing removal of the locking member from the battery cover.

5. The battery cover assembly as claimed in claim 4, wherein the washer has a center hole corresponding to the receiving hole of the battery cover to allow exposing of the latching tab of the locking member from the battery cover.

6. The battery cover assembly as claimed in claim 4, wherein the washer has a plurality of positioning holes, and the battery cover has a plurality of positioning pins, the washer is secured to the battery cover via the engagement between the pins and the positioning holes.

7. The battery cover assembly as claimed in claim 6, further comprising an engaging mechanism, the engaging mechanism configured for allowing the battery cover detachably to be engageable with the housing.

8. The battery cover assembly as claimed in claim 7, wherein the engaging mechanism comprises a plurality of hooks formed on opposite sidewalls of the battery cover, and a plurality of catch slots defined in opposite sidewalls of the housing, the hooks detachably engaging with the catch slots.

9. The battery cover assembly as claimed in claim 7, wherein the engaging mechanism comprises two latches formed at one end of the battery cover, and two detents defined in one end of the housing, the latches detachably engaging in the detents.

10. A portable electronic device, comprising:
   a battery cover, the battery cover having a receiving hole defined therein, the receiving hole being located proximate to one end of the battery cover;
   a housing, the housing having a contoured groove defined in one end thereof and defined by a contoured peripheral wall, the contoured peripheral wall including a first contoured sidewall, an opposite second contoured sidewall, a first end wall and an opposite second end wall, a width between the first contoured sidewall and the second contoured sidewall gradually decreasing from the first end wall to the second end wall, a raised dot protruding from the second contoured sidewall, the latching tab riding over the raised dot to abut against the second contoured sidewall;
   a locking member, the locking member having an operating portion and a latching tab, the operating portion being rotatably mounted in the receiving hole of the battery cover, the latching tab extending from one side of the operating portion, the latching tab being rotatably and slidably received in the contoured groove of the housing;
   wherein when the latching tab slides to a predetermined distance in the contoured groove, the latching tab is rotated a predetermined degree to be locked in the contoured groove.

11. The portable electronic device as claimed in claim 10, wherein the latching tab includes a circular protrusion and a resisting portion, the resisting portion extending from the circular protrusion, a contour of the latching tab corresponds to one of the first and second contoured sidewall.

* * * * *